(12) United States Patent
Takahashi et al.

(10) Patent No.: US 7,130,524 B2
(45) Date of Patent: *Oct. 31, 2006

(54) SIGNAL RECORDING METHOD AND APPARATUS, SIGNAL RECORDING / REPRODUCING METHOD AND APPARATUS AND SIGNAL RECORDING MEDIUM

(75) Inventors: Takao Takahashi, Tokyo (JP); Masashi Ohta, Tokyo (JP); Toshiya Akiba, Kanagawa (JP); Masami Tomita, Chiba (JP); Taro Suito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/085,389

(22) Filed: Mar. 21, 2005

(65) Prior Publication Data

US 2005/0163470 A1    Jul. 28, 2005

Related U.S. Application Data

(63) Continuation of application No. 09/823,878, filed on Mar. 30, 2001, now Pat. No. 6,952,522, which is a continuation of application No. 09/075,628, filed on May 11, 1998, now Pat. No. 6,282,155.

(30) Foreign Application Priority Data

May 19, 1997 (JP) .................................. 9-128233
Sep. 16, 1997 (JP) .................................. 9-250542

(51) Int. Cl.
  *H04N 5/93* (2006.01)
(52) U.S. Cl. ........................................ 386/52; 386/112
(58) Field of Classification Search ................. 386/46, 386/52, 95, 98, 112, 125, 126
  See application file for complete search history.

(56) References Cited

U.S. PATENT DOCUMENTS 4,970,608 A    11/1990   Fukuda et al.

(Continued)

FOREIGN PATENT DOCUMENTS

EP    0 286 412    10/1988

(Continued)

OTHER PUBLICATIONS

Patent Abstracts of Japan, vol. 1995, No. 05, Jun. 30, 1995 & JP 07 045047 A (Sharp Corp), Feb. 14, 1995.

*Primary Examiner*—Huy Nguyen
(74) *Attorney, Agent, or Firm*—Frommer Lawrence; William S. Frommer; Thomas F. Presson

(57) ABSTRACT

By reducing the number of seek operations in an operation to play back a signal from a recording medium, the amount of data temporarily stored in a read buffer memory employed in a signal recording/playback apparatus is large enough to be output as a playback signal during a seek operation, allowing a continuous playback operation to be carried out. In order to reduce the number of seek operations, a signal is always recorded onto the recording medium in continuous free areas each having a size equal to or larger than a predetermined recording/playback time length which is typically set at 1 minute. If it is necessary to insert an additional signal having a length smaller than the predetermined recording/playback time length into a point of insertion in an area already occupied by an existing signal, a continuous free area with a size equal to or larger than the predetermined recording/playback time length is newly allocated to the additional signal. The additional signal is then recorded in the free area instead of being inserted into the point of insertion. Since the free area is larger in size than the length of the additional signal, the rest of the free area is filled up with a portion of the existing signal adjacent to the point of insertion.

1 Claim, 19 Drawing Sheets

U.S. PATENT DOCUMENTS

| | | |
|---|---|---|
| 5,381,598 A | 1/1995 | Nitta et al. |
| 5,432,769 A | 7/1995 | Honjo |
| 5,594,598 A | 1/1997 | Shikakura |
| 5,802,240 A * | 9/1998 | Asai .......................... 386/52 |
| 5,805,550 A | 9/1998 | Ohmori |
| 5,859,815 A | 1/1999 | Inoue et al. |
| 5,974,220 A | 10/1999 | Kajimoto |
| 5,974,223 A | 10/1999 | Uchide |
| 6,052,346 A | 4/2000 | Arataki et al. |

FOREIGN PATENT DOCUMENTS

| | | |
|---|---|---|
| EP | 0 543 446 | 5/1993 |
| EP | 0 615 244 | 9/1994 |
| EP | 0 684 570 | 11/1995 |
| EP | 0 778 572 | 6/1997 |

* cited by examiner

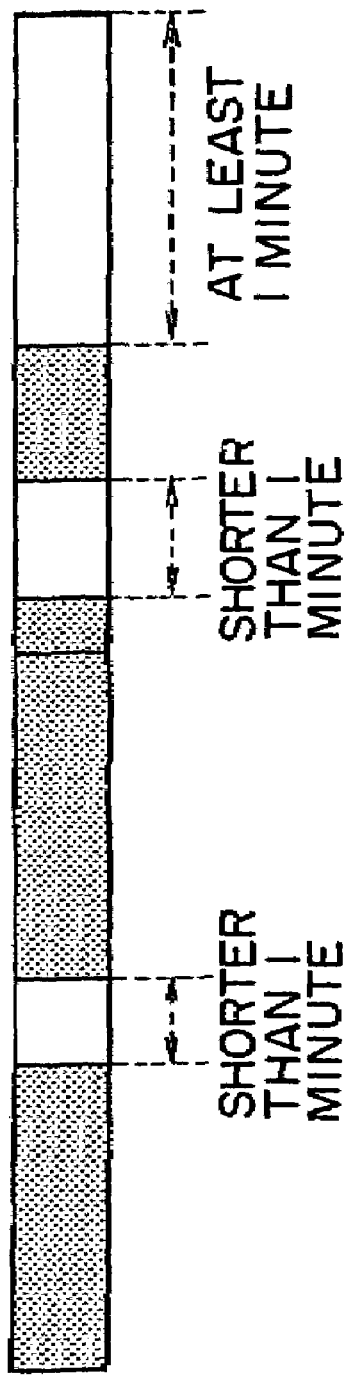
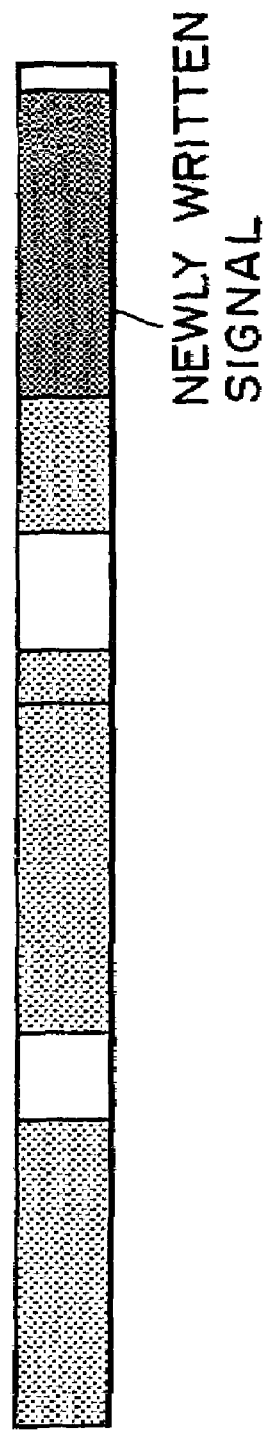

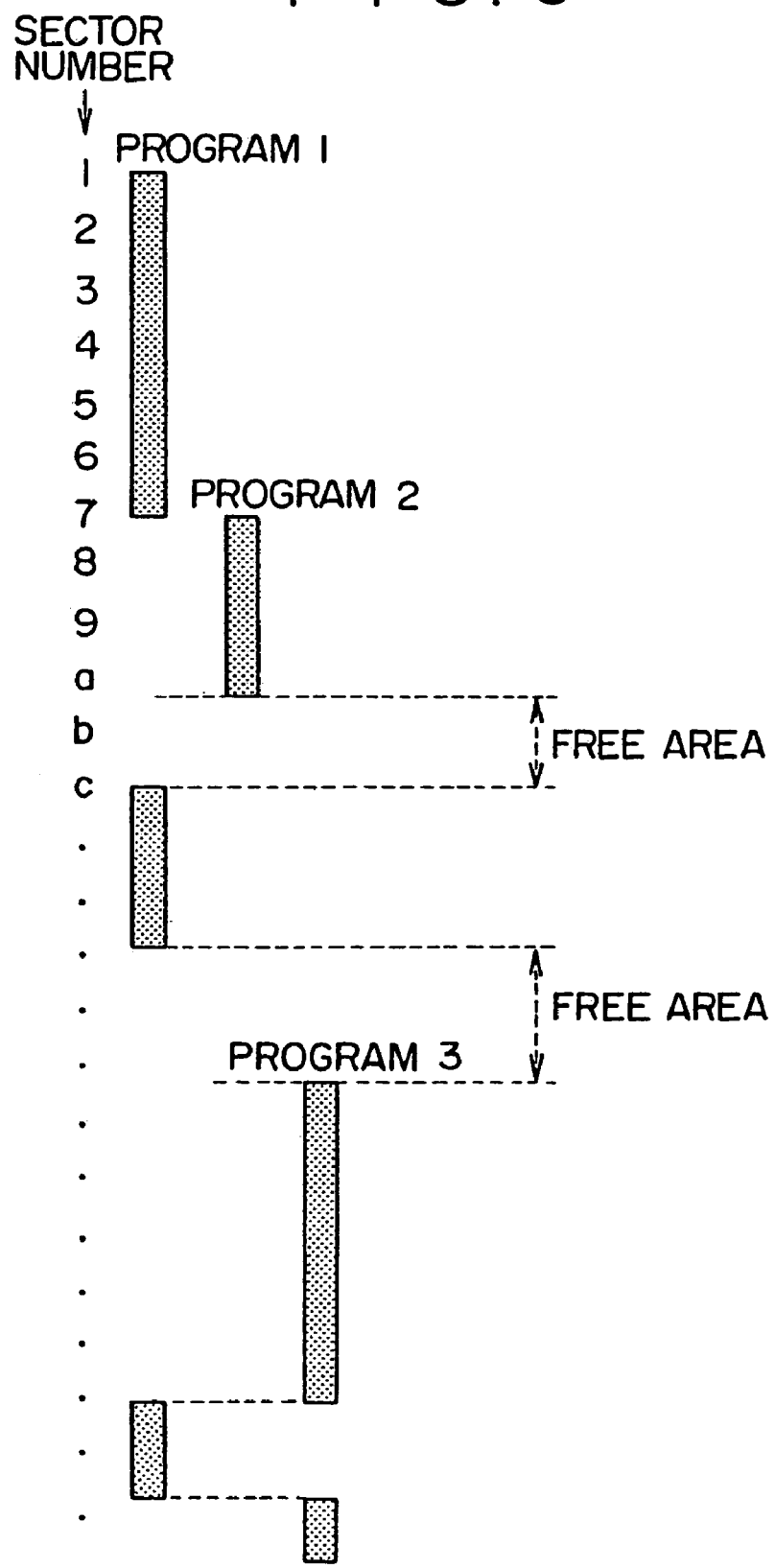

F I G. 4

| FILE NAME | RECORDING DATA AND TIME | CHANNEL | RECORDING TIME LENGTH | HEAD SECTOR NUMBER |
|---|---|---|---|---|
| BASEBALL(KYOJIN VERSUS HANSHIM) | 1997.10.10 | 04ch | 124min | 004 |
| PROFESSIONAL BASEBALL NEWS | 1997.11.02 | 10ch | 46min | 128 |
| LAUGHABLE | 1997.08.16 | 08ch | 54min | 602 |
| DORAEMON | 1995.01.01 | BS-5 | 30min | 200 |

F I G. 5

SECTOR NUMBER (= FAT ID)

| | NEXT SECTOR NUMBER |
|---|---|
| 000 | |
| 001 | |
| 002 | 003 |
| 003 | 004 |
| 004 | 005 |
| 005 | 006 |
| 006 | 007 |
| 007 | 00c |
| 008 | |
| 009 | |
| 00a | |
| 00b | |
| 00c | 00d |
| 00d | 00e |
| 00e | 018 |
| 00f | |
| 010 | |
| 011 | |
| . | |
| . | |
| 016 | |
| 017 | |
| 018 | 019 |
| 019 | fff |
| . | |
| . | |

FIG. 10(1)

| #13 | #8 | #3 | #16 | #4 | #15 | #5 | #9 | # | #11 | #7 | #14 | #2 | #6 | #10 | #12 |
|---|---|---|---|---|---|---|---|---|---|---|---|---|---|---|---|

FIG. 10(2)

| # | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|

FREE AREA    FREE AREA

1 MINUTE

1 MINUTE

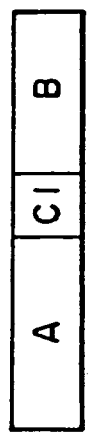
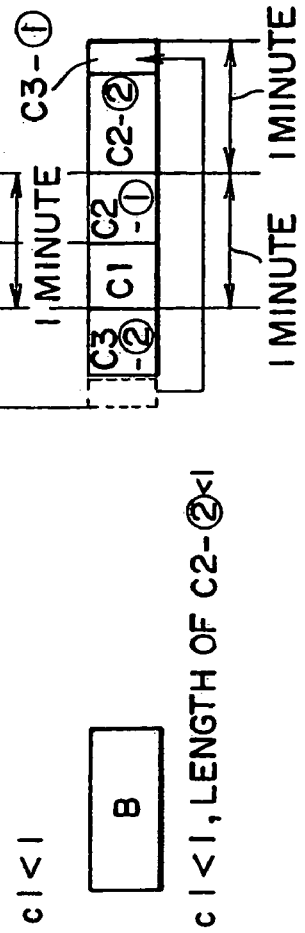
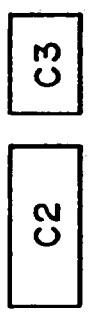
FIG. 13(1)
FIG. 13(2)
FIG. 13(3)
FIG. 13(4)
FIG. 13(5)

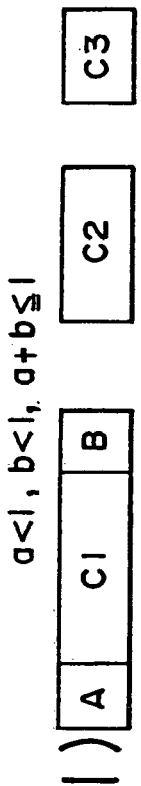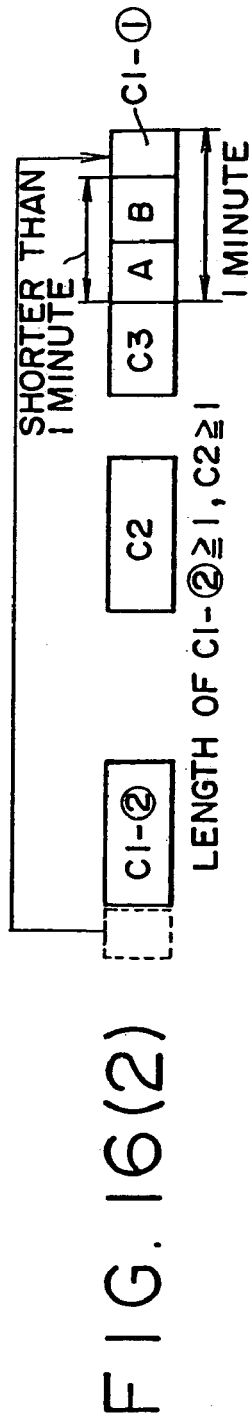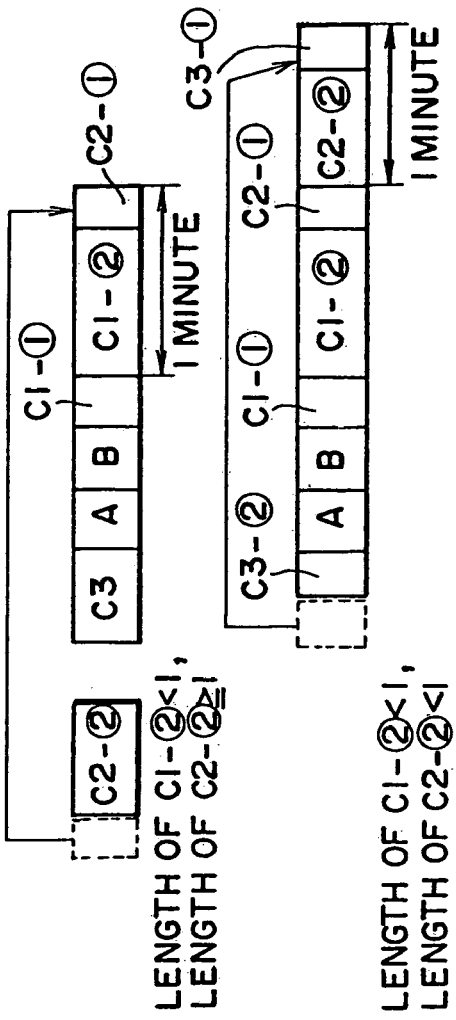
F I G. 16(1)
F I G. 16(2)
F I G. 16(3)
F I G. 16(4)

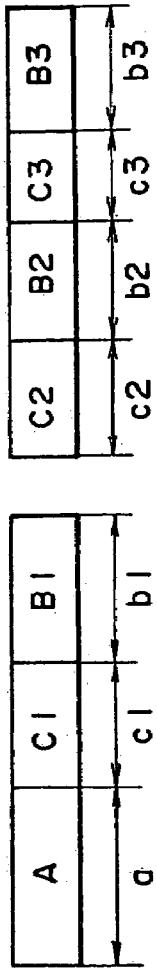
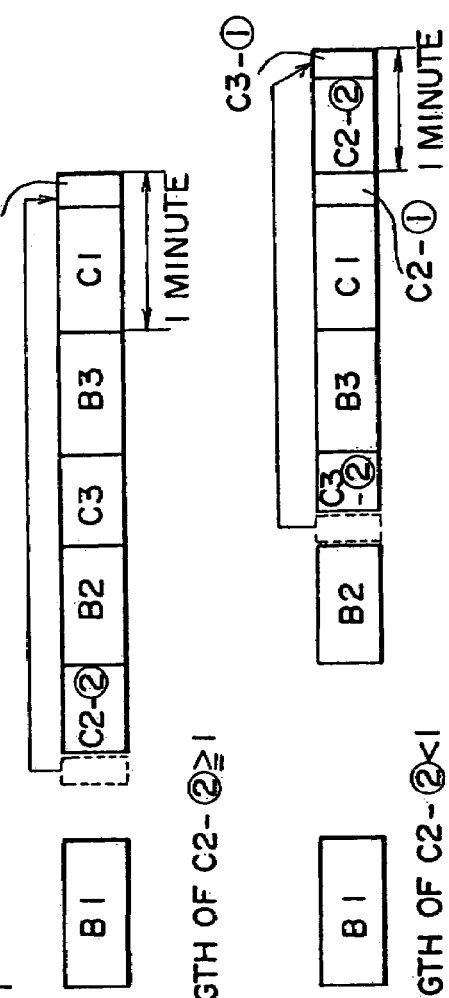
FIG. 18(1)
FIG. 18(2)
FIG. 18(3)

FIG. 21(1)

| #3 | #4 | #1 | #2 | #5 |

FIG. 21(2)

| #13 | #8 | #3 | #16 | #4 | #15 | #5 | #9 | #1 | #11 | #7 | #14 | #2 | #6 | #10 | #12 |

SIGNAL RECORDING METHOD AND APPARATUS, SIGNAL RECORDING / REPRODUCING METHOD AND APPARATUS AND SIGNAL RECORDING MEDIUM

This is a continuation of application Ser. No. 09/823,878, filed Mar. 30, 2001 now U.S. Pat. No. 6,952,522, which is a continuation of application Ser. No. 09/075,628 filed May 11, 1998, now U.S. Pat. No. 6,282,155, the entirety of which is incorporated herein by reference.

BACKGROUND OF THE INVENTION

The present invention relates to a technology for recording and playing back signals such as video and audio signals into and from an erasable recording medium such as an optical magnetic disc, a variable phase disc and a magnetic disc.

By virtue of development of band compression technologies represented by the recently introduced MPEG (Moving Picture Experts Group) compression/coding technology, signals such as audio and video signals can now be recorded into a large capacity recording medium such as an optical magnetic disc for a playback operation of a long time.

When a signal is recorded into such a recording medium, the signal undergoes a band compression/coding process, being recorded in sector units. The signal is then recorded into free areas on the recording medium.

Traditionally, a signal continuous in the time axis direction resulting from typically editing work such as an audio or video signal is recorded into a recording medium, being split into segments as shown in FIG. 21 (1). In the figure, the symbol # on each of the segments indicates the order number in an operation to play back the signal. While the segments of the signal are arranged along a straight line as shown in the figure, the signal is actually recorded on a track having a spiral shape or concentric tracks on the recording medium.

Consider a playback operation in which segment #5 is reproduced after segment #4. In this case, a reproduced signal generated by a read pickup is broken due to a seek time, a rotation wait time and a settle time which are required between segments #4 and #5. The seek time is a period of time it takes to move the read pickup in a s-called track jump to a track in area where segment #5 is recorded. On the other hand, the rotation wait time is a period of time it takes to wait for the read pickup to arrive at the position of a target sector on the track. Finally, the settle time is a period of time it takes the tracking servo of the read pickup to get settled.

In order to prevent a playback signal eventually generated by the recording/playback apparatus from being broken even if the reproduced signal generated by the read pickup is unavoidably broken as described above, a read buffer memory is provided for storing in advance a signal read out from the recording medium. The signal stored in the read buffer memory is used for filling up the time gap between two consecutive segments, that is a period of time during which no reproduced signal is generated by the read pickup. The signal stored in the read buffer memory is then output when the reproduced signal generated by the read pickup is broken.

In the case of a recorded signal split into a large number of segments as shown in FIG. 21 (2), however, it is quite within the bounds of possibility that the amount of data stored in advance in the read buffer memory during the time is not large enough to be used for filling up a time gap between two consecutive segments. As a result, the eventual playback signal can not be generated continuously.

SUMMARY OF THE INVENTION

The present invention addresses the problems described above. It is thus an object of the present invention to provide a technology that makes a continuous playback operation possible by assuring that the amount of data stored in a read buffer memory is large enough for eliminating a playback time break through reduction of the number of seek operations.

In order to achieve the object of the present invention, the present invention provides a signal recording method whereby, in an operation to record a signal onto a recording medium, the signal is recorded in continuous free areas each having a size equal to or larger than a predetermined recording/playback time length.

In addition, the present invention also provides a signal recording/playback method wherein, in an operation, to insert an additional signal having a length smaller than a predetermined recording/playback time length into a point of insertion in an area on a recording medium already occupied by an existing signal the signal recording/playback method is implemented by executing the steps of:

newly allocating a continuous free area on the recording medium with a size of at least the equivalence of the predetermined recording/playback time length to the additional signal;

recording the additional signal in the continuous free area; and filling up the rest of the continuous free area with a portion of the existing signal adjacent to the point of insertion.

Furthermore, the present invention also provides a signal recording/playback method wherein, in case a signal already recorded on a recording medium has a continuous segment smaller in size than an equivalence of a predetermined recording/playback time length, the signal recording/playback method is implemented by executing the steps of:

newly allocating a continuous free area on the recording medium with a size of at least the equivalence of the predetermined recording/playback time length to the segment;

relocating the segment to the continuous free area; and filling up the rest of the continuous free area with a portion of the signal adjacent to the segment.

On the top of that, the present invention also provides a signal recording apparatus for recording a signal onto a recording medium, the apparatus comprising:

a 1st means for recognizing a continuous free area on the recording medium with a size equal to or larger than a predetermined recording/playback time length; and a 2nd means for executing control to record a signal onto the continuous free area.

In addition, the present invention also provides a signal recording/play back apparatus for recording and playing back a signal onto and from a recording medium, the apparatus comprising:

a 1st means for recognizing a continuous free area on the recording medium with a size equal to or larger than a predetermined recording/playback time length; and a 3rd means for executing control to record a signal, which is supposed to be newly inserted into a point of insertion in an area on the recording medium already occupied by an existing signal, onto the continuous free area and to fill up the rest of the continuous free area with a portion of the existing signal adjacent to the point of insertion.

Furthermore, the present invention also provides a signal recording/play back apparatus for recording and playing back a signal onto and from a recording medium, the apparatus comprising:

a 1st means for recognizing a continuous free area on the recording medium with a size equal to or larger than a predetermined recording/playback time length; and a 4th means for executing control to relocate a continuous segment of a signal already recorded on the recording medium having a size smaller than a predetermined recording/playback time length and to fill up the rest of the continuous free area with a portion of the already recorded signal adjacent to the segment.

On the top of that, the present invention also provides a signal recording medium wherein a signal is recorded into continuous areas each having a size equal to or larger than a predetermined recording/playback time length.

According to one aspect of the present invention, there is provided a signal recording apparatus provided for recording a signal onto a recording medium wherein:

a 1st means is used for recognizing a continuous free area on the recording medium with a size equal to or larger than a predetermined recording/playback time length; and a 2nd means is used for executing control to record a signal onto the continuous free area.

In addition, according to another aspect of the present invention, there is provided a signal recording/play back apparatus for recording and playing back a signal onto and from a recording medium wherein:

a 1st means is used for recognizing a continuous free area on the recording medium with a size equal to or larger than a predetermined recording/playback time length; and a 3rd means is used for executing control to record a signal, which is supposed to be newly inserted into a point of insertion in an area on the recording medium already occupied by an existing signal, onto the continuous free area and to fill up the rest of the continuous free area with a portion of the existing signal adjacent to the point of insertion.

On the top of that, according to a further aspect of the present invention, there is provided a signal recording/play back apparatus for recording and playing back a signal onto and from a recording medium wherein:

a 1st means is used for recognizing a continuous free area on the recording medium with a size equal to or larger than a predetermined recording/playback time length; and a 4th means is used for executing control to relocate a continuous segment of a signal already recorded on the recording medium having a size smaller than a predetermined recording/playback time length and to fill up the rest of the continuous free area with a portion of the already recorded signal adjacent to the segment.

BRIEF DESCRIPTION OF THE DRAWINGS

An embodiment of the present invention will be described by reference to the following diagrams wherein:

FIGS. 2 (1) and (2) are diagrams each showing a layout of a signal on a disc undergoing an operation to record an additional signal portion carried out by the signal recording/playback apparatus onto the disc;

FIG. 3 is a diagram showing locations of 3 programs recorded in 3 files on the disc with locations of each of the files represented by a straight line pattern;

FIG. 4 is a table showing an example of file system control information comprising entries to be referenced by a file system;

FIG. 5 shows an example of a FAT (File Allocation Table);

FIGS. 10 (1) and 10 (2) are diagrams showing general optimization of a signal;

FIGS. 13 (1) to 13 (5) are diagrams showing examples of editing work carried out on a signal;

FIGS. 16 (1) to 16 (4) are diagrams showing further examples of editing work carried out on a signal;

FIGS. 18 (1) to 18 (3) are diagrams showing still further examples of editing work carried out on a signal;

FIGS. 21 (1) and (2) are explanatory diagrams used for describing the ordinary method to play back a signal.

DETAILED DESCRIPTION OF THE PREFERRED EMBODIMENT

The above and other objects, features as well as many of the attendant advantages of the present invention will become more apparent and, thus, more readily appreciated as the game becomes better understood from a careful study of the following detailed description of a preferred embodiment of present invention with reference to the accompanying diagrams. The description is divided into sections listed below which are explained sequentially in the order the sections are put on the following list:

1 Configuration of the Signal Recording/Playback. Apparatus,
2 Recording of an Additional Signal
3 Recognition of Free Areas
4 Editing
5 optimization
6 Editing Details.

1 Configuration of the Signal Recording/Playback Apparatus

Figure 1:
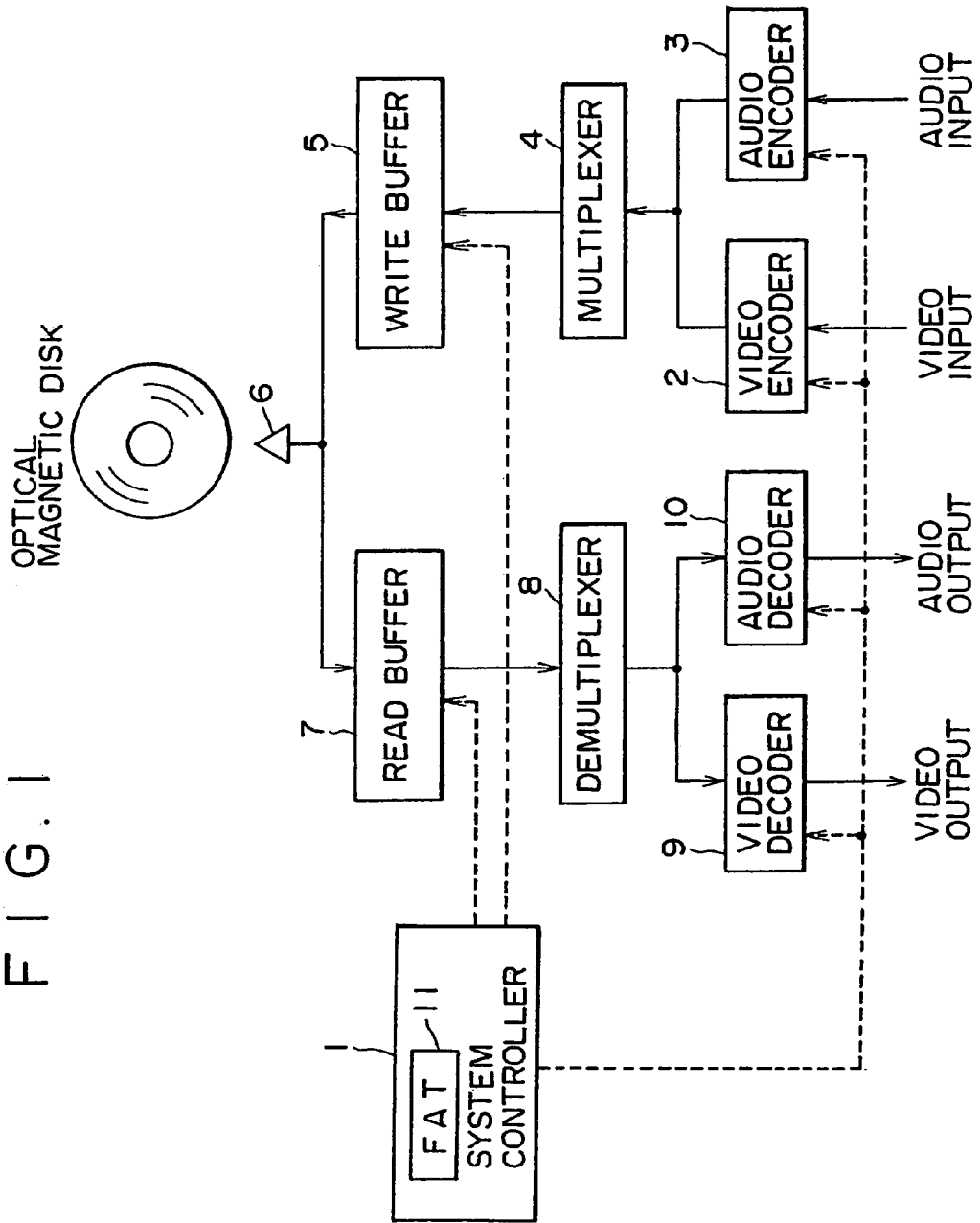
FIG. 1 is a block diagram showing the configuration of a signal recording/playback apparatus to which the present invention is applied.

FIG. 1 is a block diagram showing the configuration of a signal recording/playback apparatus to which the present invention is applied. The signal recording/playback apparatus records and plays back video and audio signals into and from a solid memory represented by an optical magnetic disc, a magnetic disc, a magnetic tape and a semiconductor memory in addition to a data recording medium in general by multiplexing the signals. In order to simplify the description, however, only an optical magnetic disc which is referred to hereafter simply as a disc is explained as a representative.

In this signal recording/playback apparatus, a system controller 1 controls the apparatus as a whole in addition to carrying out other functions. A video encoder 2 performs a video encoding process on a video signal supplied thereto. By the same token, an audio encoder 3 carries out an audio encoding process on an audio signal supplied thereto. A multiplexer 4 multiplexes the outputs of the video and audio encoders 2 and 3. A write buffer memory 5 is used for temporarily storing the output of the multiplexer 4. A pickup 6 is used for writing the output of the write buffer memory 5 onto a disc. In addition; the pickup 6 is also used for reading out a playback signal from the disc and outputting the signal played back from the disc to a read buffer memory 7 which is used for temporarily storing the signal read out from the disc by the pickup 6. A demultiplexer 8 splits the output of the read buffer memory 7 back into video and audio data. A video decoder 9 carries out a video decoding process on the video data resulting from the split done by the demultiplexer 8. By the same token, an audio decoder 10 carries out an audio decoding process on the audio data resulting from the split done by the demultiplexer 8.

2 Recording of an Additional Signal

FIGS. 2 (1) and (2) are diagrams each showing recording a layout of a signal on a disc undergoing an operation to record an additional signal portion by the signal recording/playback apparatus onto the disc. To be m more specific, FIG. 2 (1) is a diagram showing a recording layout prior to the additional recording operation and FIG. 2 (2) is a diagram showing a recording layout after the additional recording operation. In the figures, a portion shown as a thin mesh denotes an area in which the signal is recorded. As shown in the figure, an additional signal is not split into segments to be each recorded into a freed area with a length smaller than a predetermined value, typically an equivalent of the 1-minute recording/playback time length. Instead, the additional signal is recorded into a continuous free area with a length equal to or larger than the 1-minute recording/playback time length.

3 Determination of Free Areas

This section explains a means for recognizing a continuous free area of at least the predetermined typical value, that is, an equivalent of the 1-minute recording/playback time length in length.

(a) Means for Recognizing Free Areas

Information on files on the disc is all recorded in a TOC (Table of Contents) area. At the time the disc is mounted on the signal recording/playback apparatus, the system controller 1 reads out this information on files from the TOC area and controls the files on the disc till the disc is taken out from the apparatus. In order to control files on the disc, the system controller 1 is provided with a FAT (File Allocation Table) 11. The location and attributes such as the number, the recording date & time and the file name of each file on the disc are controlled by referencing the FAT 11. The FAT 11 is used for controlling the information on files in smallest access units, typically sector units, used by the system, that is, the signal recording/playback apparatus for making an access to the disc. It should be noted that, in this embodiment, 1 sector is 2,048 bytes (or 2 K bytes) in size.

FIG. 3 is a diagram showing locations of 3 programs recorded in 3 files on the disc with locations of each of the files represented by a straight line pattern. For example, continuous data of Program 1 is recorded by splitting the data into 3 segments forming a pattern along a straight line for physical reasons encountered during an operation to record the data onto the disc.

As shown in the figure, a file system in the system controller 1 controls information on the file of Program 1 by keeping records indicating that the data of Program 1 is recorded continuously from sectors 1 to 7 and then jumps to sector c in the FAT 11. The file system obtains information on free areas by scanning the FAT 11. It should be noted that this technique of controlling information on files can be the same technique as that adopted by a file control system of an ordinary computer.

File system control information including the FAT 11 described above is all written into the TOC area before the disc is taken out from the signal recording/playback apparatus.

FIG. 4 is a table showing an example of file system control information. Provided for a file, each entry of the table includes attribute information of the file such as the name of the file (that is, the name of a program stored in the file), a recording date & time, a recording channel, a recording time and a first sector of the file as shown in the figure. When an access is made to a file, the file system refers to the entry for the file and starts the access. It is needless to say that other file attribute information can be added to the table.

FIG. 5 shows an example of the FAT 11. The example is a table for data of a program which is not recorded in physically consecutive sectors on the disc. In this case, for each sector storing the data, the number of a next sector for storing the same data is recorded. In order to make the table shown in the figure easy to understand, a free area is represented by blanks. In actuality, however, the free area is filled up with codes "000". The end of a file is indicated by a code "fff". Thus, a free area is found by sequentially scanning the left column of the FAT starting from sector 000 and ending at a sector with the next sector thereof on the right column having a blank ("000") sector number. The size of a free area is found by counting the numbers of physically consecutive sectors included in the free area.

(b) Searching for a free area with a size greater than an equivalent of the 1-minute recording/playback time length There are 4 methods which can be adopted by the file system for forming a judgment as to whether or not the size of a physically continuous free area is at least an equivalent of the 1-minute recording/playback time length.

According to a 1st method, the judgment is formed by determining whether or not the free area can be used for accommodating data recorded for a period of time of at least 1 minute at the maximum recording rate. According to a 2nd method, the amount of data recorded for a 1-minute period of time is first calculated by assuming a fixed recording rate in each measurement time unit. The recording rate may vary from unit to unit. It should be noted, however that, since the measurement time unit itself is also typically 1 minute in length anyway, in actuality, the recording rate can be assumed to be fixed during the 1-minute period of time. The judgment is then formed by comparing the calculated amount of data with the size of the free area. According to a 3rd method, the judgment is formed by simply determining whether or not the size of the free area is greater than a predetermined amount of data typically expressed in terms of bytes instead of the amount of data recorded for a 1-minute measurement time used in the 2nd method. According to a 4th method, the amount of data recorded for a 1-minute period of time is first calculated by assuming a fixed recording rate during the 1-minute period of time. In this case, the amount of data resulting from the calculation is also fixed. The judgment is then formed by comparing the calculated amount of data with the size of the free area. The 2nd method, a representative one among the 4 methods, is explained as follows.

In order to implement a fixed recording rate (that is, a fixed encoding bit rate) during the 1-minute period of time prescribed by the 2nd method, it is necessary to execute control so that the number of bits generated by the video encoder which is typically implemented by an MPEG2 encoder in 1 minute is constant.

A degree of difficulty of carrying out video encoding on a picture is defined as a product of the number of generated bits and an average quantization width in 1 picture. In the so-called variable rate encoding process, the number of generated bits is adjusted as follows. In the case of a picture requiring video encoding at a high degree of difficulty, encoding needs to be carried out at an encoding bit rate greater than the past average bit rate to allocate a number of generated bits larger than what would be obtained at the average bit rate in the past to a complex picture. In the case of a picture requiring video encoding with a low degree of difficulty, on the other hand, encoding can be performed at an encoding bit rate smaller than the past average bit rate to allocate a number of generated bits smaller than what would be obtained at the average bit rate in the past to a simple picture.

In order to make the rate of generated bits fixed within the 1-minute period of time, on the other hand the actual rate of generated bits is fed back to be compared with a target value. To put it in detail, if the total amount of code generated in the past is found smaller than a product of a target average bit rate and the lapse time, the number of allocated bits is increased. If the total amount of code generated in the past is found greater than the product of the target average bit rate and the lapse time, the number of allocated bits is decreased. As a result, when viewed over along a period of time of typically 1 minute, recording is still carried out at a fixed bit rate by virtue of an effect provided by the feedback system. At the same time, a large number of bits and a small number of bits are still allocated to complex and simple pictures respectively as a result of the application of the variable rate encoding process described above, giving rise to an effect that, a characteristic of a variable encoding bit rate for different kinds of picture that enables transmission without sacrificing the quality of the picture is sustained as it is.

Figure 6:
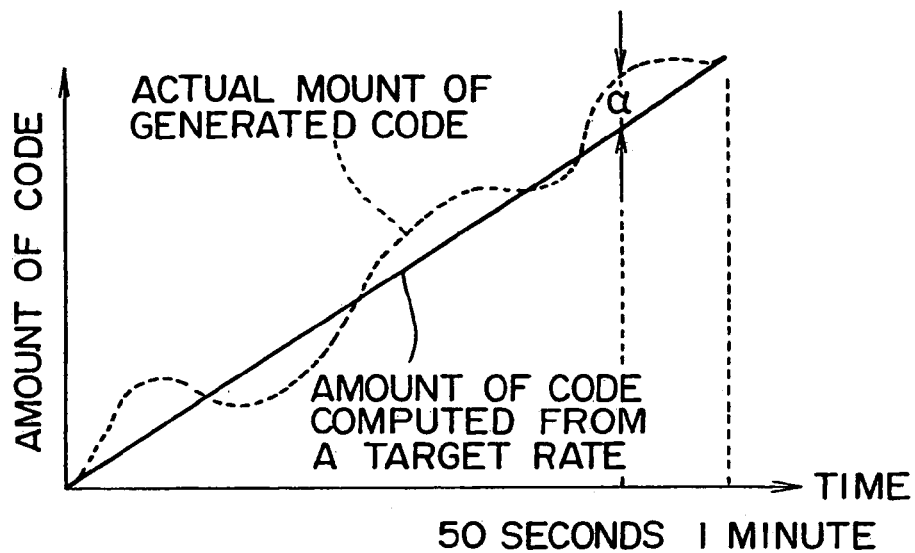
FIG. 6 is a diagram showing a technique for implementing control of a fixed rate to be achieved in a 1-minute period of time.
Figure 7:
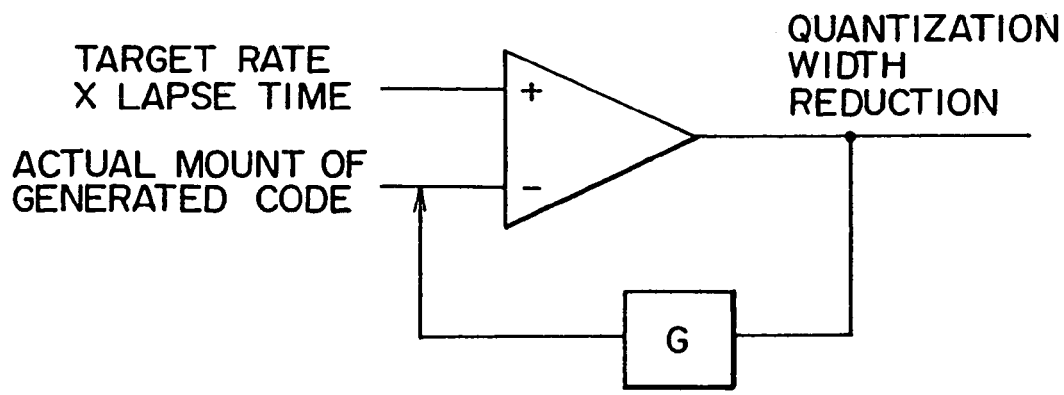
FIG. 7 is a block diagram showing the configuration of an apparatus implementing the fixed rate control.

With the variable rate encoding process and the feedback system applied as they are, however, there is no assurance that a target average bit rate can be achieved with a very high degree of accuracy. In order to solve this problem, an adapted feedback loop with a feedback gain G shown in FIG. 7 is used. In this feedback loop, the gain G is raised approximately before a time of typically 50 seconds lapses since the start of the 1-minute period of time, so that the actual total amount of generated code is forcibly brought to a value equal to the product of a target average bit rate and the lapse time. To put it concretely, the difference between the actual total amount and the product at a point of time a 50-second period of time has lapsed since the start of the 1-minute period of time is brought to a value within a range ALPHA as shown in FIG. 6 by raising the gain G sometime prior to the point of time.

Figure 8:
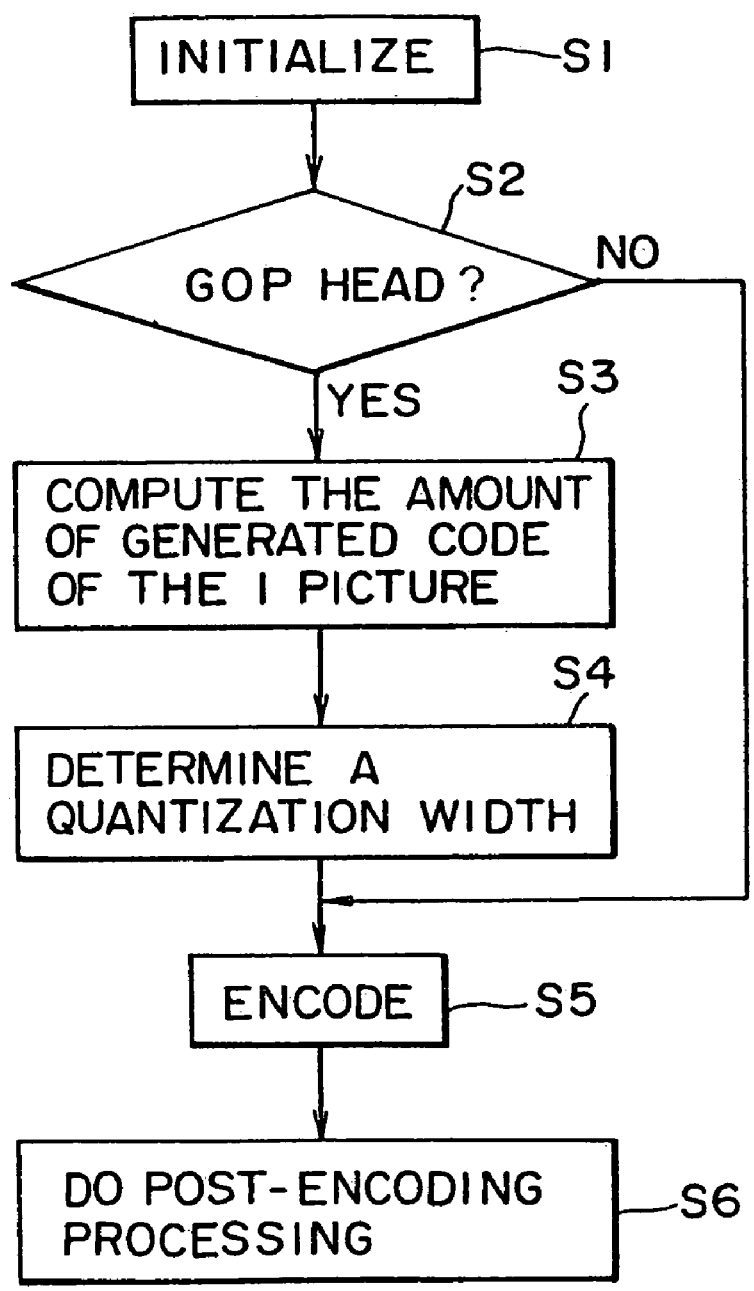
FIG. 8 shows a flowchart representing an encoding process for implementing the fixed rate control.

FIG. 8 shows a flowchart representing an encoding process. As shown in the figure, the flowchart begins with a step S1 at which a target average encoding bit rate, a maximum encoding bit rate, a minimum encoding bit rate and other parameters such as the range ALPHA are set.

The flow of the encoding process then goes on to a step S2 to form a judgment as to whether or not a signal being input is the head of a GOP (Group of Pictures). If the head of a GOP is input, the flow of the encoding process proceeds to a step S3 at which the amount of generated code for an I picture is computed. Then, the flow of the encoding process continues to a step S4 at which the number of allocated bits is computed and the quantization width is adjusted to a value between the maximum and minimum encoding bit rates. In addition, a quantization table is created. Subsequently, the flow of the encoding process goes on to a step S5 at which all macroblocks of a picture are encoded. The flow then proceeds to a step S6 at which the number of generated bits is counted. The number of generated bits is used in the adjustment of the quantization width carried out at the step S4. If the outcome of the judgment formed at the step S2 indicates that the input signal is not the head of a GOP, on the other hand, the flow of the encoding process continues directly to the step S5.

In the encoding process described above, the quantization width is determined so that the actual amount of generated code can be brought to a value all but equal to the target code value at the last GOP. It should be noted that the number of allocated bits can also be controlled in picture units in place of GOP units. In addition, changing the quantization width is equivalent to manipulating a quantization table (a Q table) in the case of the MPEG encoding.

4 Editing

Figure 9:
FIGS. 9 (1) to 9 (5) are diagrams showing layouts of a signal recorded on the disc of the signal recording/playback apparatus shown in FIG. 1 in an editing process.
Figure 9:
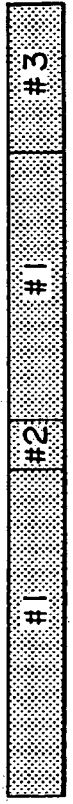
Figure 9:
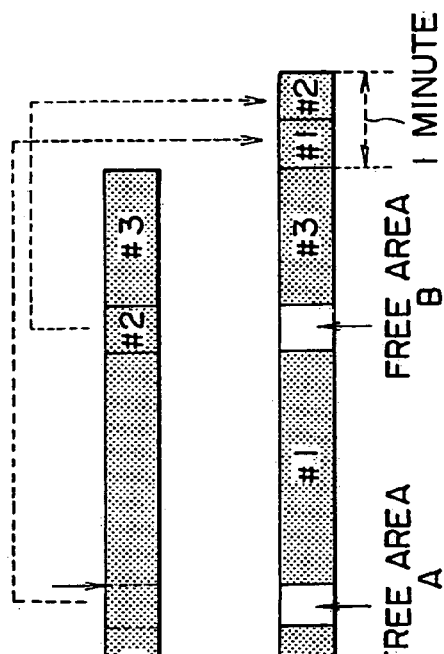
Figure 9:
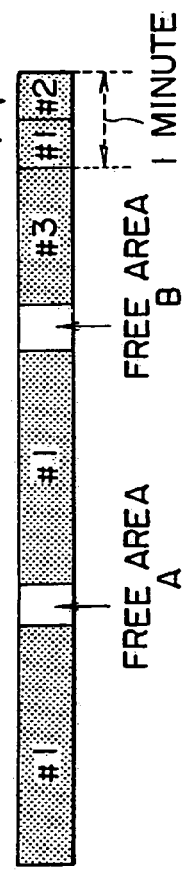
Figure 9:

FIGS. 9 (1) to 9 (5) are diagrams showing layouts of a signal recorded on the disc of the signal recording/playback apparatus shown in FIG. 1 in a typical editing process.

In this typical editing process, assume that portion #2 with a length of smaller than the 1-minute recording/playback time length is moved from its original position in a signal shown in FIG. 9 (1) to a point of insertion indicated by an arrow by insertion. As the process to rewrite the signal due to the insertion of portion #2 is completed, the new layout of the signal is changed to that shown in FIG. 9 (2). In the insertion, the process to rewrite portion #1 of the signal behind the point of insertion takes a lot of time and labor.

In order to solve the problem described above, the signal is edited from a layout shown in FIG. 9 (3) to a layout shown in FIG. 9 (4). To put it in detail, a continuous free area with a length equal to or larger than the 1-minute recording/ playback time length on the disc is allocated. In the free area, portion #2 and a part in portion #1 in front of the point of insertion shown in FIG. 9 (1) on the time axis are written into the free area to fill up the free area, resulting in the layout shown in FIG. 9 (4). Assume that the free area is an equivalent of the 1-minute recording/playback time length in length as shown in the layout of FIG. 9 (3). In this case, the length of the part of portion #1 moved to the free area that is, the length of area A shown in FIG. 9 (4), is equal to (the length corresponding to a recording time of 1 minute—the length of portion #2). As a result of the work to edit the signal from the layout shown in FIG. 9 (3) to that shown in FIG. 9 (4), the resulting continuous blocks each have a length greater than an equivalent of the 1-minute recording/ playback time length. Thus, seek operations are carried out at intervals longer than 1 minute, providing a period of time between two consecutive seek operations which is long enough for filling the read buffer memory with data of an amount sufficiently large to be output during a track jump. As a result, a playback operation can be carried out without a playback time break. It should be noted that #1, #2, #3 and #4 in the layout shown in FIG. 9 (5) are consecutive numbers in the time axis direction which correspond respectively to #1 at the left end, #1 and #2 at the right end, #1 in the middle and #3 in the layout shown in FIG. 9 (4).

In the work to edit the signal from the layout shown in FIG. 9 (3) to that shown in FIG. 9 (4) described above, area A, the data of which is moved to the free area, is located in front of the point of insertion. It should be noted that, however, area A can be located behind the point of insertion. In this case, the data of area A is moved to a location in the free area behind portion #2. As an alternative, area A can comprise 2 sub-areas sandwiching the point of insertion. In this case, portion #2 in the free area is sandwiched by 2 pieces of data moved from the 2 sub-areas of area A respectively.

5 Optimization

Consider a case in which segments #1 to #16 of a signal recorded on the disc are consecutive in the time axis direction but not recorded at physically continuous areas as shown in FIG. 10 (1). The segments can be rearranged in a so-called defragmentazion process so that they are recorded at physically continuous areas as shown in FIG. 10 (2). In this case, however, it takes a very long time to rearrange the segments as such and the rearrangement can not be the to be always practical.

Figure 11:
FIGS. 11 (11) to 11 (5) are diagrams showing general optimization of a signal carried out in the embodiment.
Figure 11:
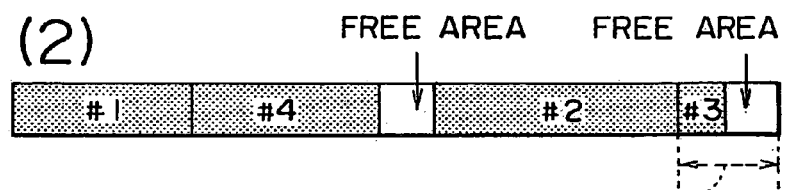
Figure 11:
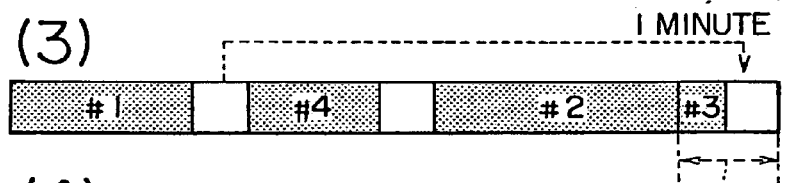
Figure 11:
Figure 11:

In order to solve the problem described above, in this embodiment, only segments each with a length of smaller than the 1-minute recording/playback time length recorded in scattered areas are treated as a target of rearrangement in order to make all continuous blocks of the signal at least the equivalent of the 1-minute recording/playback time length in size. Consider, for example, a signal with only segment #3 having a length of smaller than the 1-minute recording/ playback time length as shown in FIG. 11 (1). In this case, first of all, a free area with a size of an equivalent of the 1-minute recording/playback time length is allocated and segment #3 is moved thereto to result in a layout shown in FIG. 11 (2). Then, a portion at the head of segment #4 with a length equal to (a length corresponding to the equivalent of the 1-minute recording/playback time length—the length of segment #3) is cut out and moved to the free area behind segment #3 as shown in FIG. 11 (3) to fill up the free area, resulting in a layout shown in FIG. 11 (4). Finally, the segment numbers are revised into consecutive numbers arranged in an ascending order in the time axis direction to result in a layout shown in FIG. 11 (5). As shown in FIG. 11 (5), the resulting continuous blocks of the signal at their physical locations on the disc each have a length greater than the equivalent of the 1-minute recording/playback time length with the playback order remaining unchanged. Thus, the number of seek operations is reduced, allowing a playback operation to be carried out smoothly. In this way, a file of a signal on the disc can be optimized with ease.

6 Editing Details

Figure 12:
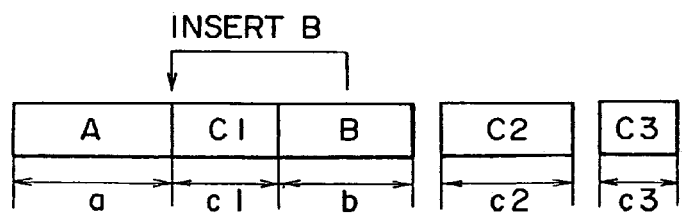
FIG. 12 is a diagram showing a signal to be edited in the embodiment.

Next, the editing technique shown in FIG. 9 is explained in detail. FIG. 12 is a diagram showing a signal to be edited in the embodiment. As shown in the figure, segments A, C1, C2 and C3 constitute a continuous sequence of data. Assume that segment B is inserted between segments A and C1. Let symbols a, c1, b, c2 and c3 denote the lengths of segment A, C1, B, C2 and C3 respectively. Editing technique applied to a variety of cases are explained as follows.

A Lengths a and b equal to or larger than the 1-minute recording/playback time length FIG. 13 (1) is a diagram showing a case in which segment B to be inserted completes the data at segment C1. Since segments C2 and C3 of the signal shown in FIG. 12 do not exist, segment B is merely inserted between segments A and C1. However, it is not necessary to physically move segments B and C1. What needs to be done is just changing the playback pointers to A→B→C1. In this case, since segment C1 is the segment to be played back last, there is no triggered seek operation after segment C1. Thus, the length c1 of segment C1 can be smaller than 1 minute of playback time.

FIG. 13 (2) is a diagram showing a case in which the data continues to segment C3. Even in this case, segment B is just inserted between segments A and C1 provided that the length c1 of segment C1 is at least an equivalent of the 1-minute recording/playback time length. That is to say, by merely changing the playback pointers from A→C1→C2→C3 to A→B→C1→C2→C3, insertion on the time axis is completed without the need to physically inserts segments A and C1. In this case, the length c2 of segment C2 must be of course at least an equivalent of the 1-minute recording playback time length as is the case with the length c1 of segment C1. To be played back last, however, the length c3 of segment C3 can be smaller than the 1-minute recording/playback time length.

Much like FIG. 13 (2), FIG. 13 (3) is a diagram showing a case in which the data continues to segment C3. In the latter case, however, the length c1 of segment C1 is smaller than the 1-minute recording/playback time length. Therefore, if segment B is merely inserted between segments A and C1, the amount of data temporarily stored in the read buffer memory during the operation to playback segment C1 having a length c1 smaller than the 1-minute recording/ playback time length will not be large enough to be used as an output playback signal during a seek operation accompanying a track jump from segment C1 to segment C2 following the operation to playback segment C1 in the playback operation. In order to solve this problem caused by the small length c1 of segment C1, the data is edited by adopting a technique shown in FIG. 13 (4), a diagram showing an editing technique which comprises the steps of:

allocating a free area having a size of at least an equivalent of the 1-minute recording/playback time length;

concatenating segment C1 with a portion at the head of segment C2 denoted by notation "C2–(1)" in the figure to form a lump of data having a size equal to that of the allocated free area; and physically relocating the lump of data to the allocated free area to fill up the area.

It should be noted that, if a free area having a size of at least an equivalent of the 1-minute recording/playback time length can not be allocated, the editing can not be done and is thus ended unsuccessfully.

By physically relocating the lump of data in the editing technique described above, a seek operation following an operation to play back a continuous segment having a size smaller than the 1-minute recording/playback time length can be eliminated provided that the remaining part of segment C2 denoted by notation "C2–(2)" in the figure after removing the portion at the head of segment C2 de noted by notation "C2–(1)" is at least an equivalent of the 1-minute recording/playback time length in size. In this case, the editing work is completed successfully.

If the remaining part of segment C2 denoted by notation "C2–(2)" is smaller an equivalent of the 1-minute recording/playback time length in size, however, the amount of data stored temporarily stored in the read buffer memory to be output as a playback signal during a seek operation accompanying a track jump from the remaining part of segment C2 denoted by notation "C2–(2)" to segment C3 will be smaller than the 1-minute recording/playback time length. In order to solve this problem caused by the small length of the remaining part denoted by notation "C2–(2)" of segment C2, the data is edited by adopting a technique shown in FIG. 13 (5), a diagram showing an editing technique which comprises the steps of:

allocating a free area having a size of at least an equivalent of the 1-minute recording/playback time length behind the relocated portion at the head of segment C2 denoted by notation "C2–(1)";

concatenating the remaining part of segment C2 denoted by notation "C2–(2)" with a portion at the head of segment C3 denoted by notation "C3–(1)" in the figure to form a lump of data having a size equal to that of the allocated free area; and physically relocating the lump of data to the allocated free area to fill up the area.

By physically relocating the lump of data in the editing technique described above, a seek operation following an operation to play back a continuous segment having a size smaller than the 1-minute recording/playback time length can be eliminated. It should be noted that, if a free area having a size of at least an equivalent of the 1-minute recording/playback time length can not be allocated behind the relocated portion at the head of segment C2 denoted by notation "C2–(1)", the area originally occupied by segment C2 with a guaranteed size equal to or larger than the 1-minute recording/playback time length can be used as a free area.

The editing technique shown in FIG. 13 (5) can be applied to subsequent segments C4 and C5 if they exist after segment C3.

B Length a of smaller than the 1-minute recording/playback time length and length b equal to or larger than the 1-minute recording/playback time length In this case, if segment B is merely inserted between segments A and C1, the amount of data temporarily stored in the read buffer memory during an operation to playback segment A having a length smaller than the 1-minute recording/playback time length will not be large enough to be used as an output playback signal during a seek operation accompanying a track jump from segment A to segment B following the operation to playback segment A in the playback operation. In order to solve this problem caused by the small length a of segment A, the data is edited by adopting a technique shown in FIG. 14 (2), a diagram showing an editing technique which comprises the steps of:

allocating a free size of at least an equivalent of the 1-minute recording/playback time length;

concatenating segment A with a portion at the head of segment B denoted by notation "B–(1)" in the figure to form a lump of data having a size equal to that of the allocated free area; and physically relocating the lump of data to the allocated free area to fill up the area.

It should be noted that, if a free area having a size of at least an equivalent of the 1-minute recording/playback time length can not be allocated, the editing can not be done and is thus ended unsuccessfully.

By physically relocating the lump of data in the editing technique described above, a seek operation following an operation to play back a continuous segment having a size smaller than the 1-minute recording/playback time length can be eliminated provided that the remaining part of segment B denoted by notation "B–(2)" in the figure after removing the portion at the head of segment B denoted by notation "B–(1)", that is a length {b–(1–a)}, is at least an equivalent of the 1-minute recording/playback time length in size. In this case, the editing work is completed successfully.

It is thus necessary to form a judgment as to whether or not the length {b–(1–a)} is at least an equivalent of the 1-minute recording/playback time length or a length (a+b) is at least an equivalent of the 2-minute recording/playback time length.

If (a+b) is at least an equivalent of the 2-minute recording/playback time length in size, the amount of data temporarily stored in the read buffer memory during an operation to playback the remaining part of segment B denoted by notation "B–(2)" will be large enough to be used as an output playback signal during a seek operation accompanying a track jump from the remaining part of segment B to segment C1 following the operation to playback the remaining part of segment B in the playback operation. Then, it is necessary to form a judgment as to whether or, not the length c1 of segment C1 is at least an equivalent of the 1-minute recording/playback time length, or whether or not segment C1 is the last segment of the data. If either of the conditions is satisfied, a seek operation following an operation to play back a continuous segment having a size smaller than the 1-minute recording/playback time length can be eliminated in which case, the editing work is completed successfully. If both the conditions are not satisfied, on the other hand, the problem caused by the small length c1 segment C1 can be solved by applying a method similar to the editing technique shown in FIGS. 13 (3) to (5) of Subsection A with the title "Lengths a and b equal to or larger than the 1-minute recording/playback time length" described above.

Figure 14:
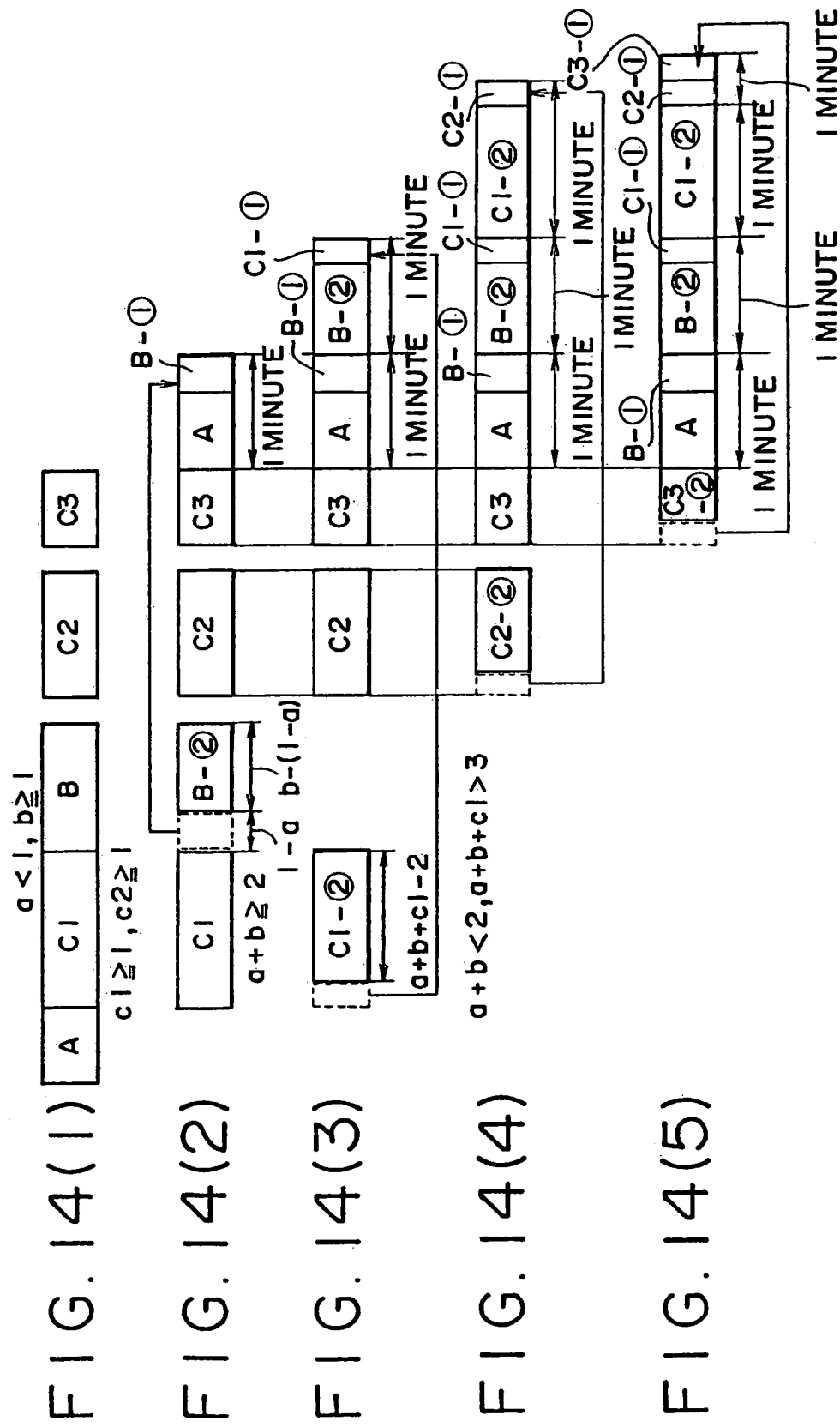
FIGS. 14 (1) to 14 (5) are diagrams showing other examples of editing work carried out on a signal.

To put it in detail, if (a+b) is smaller than the 2-minute recording/playback time length in size, the problem caused by the small length of the remaining part denoted by notation "B–(2)" of segment B is solved by applying an editing technique shown in FIG. 14 (3), a diagram showing an editing technique of forming a judgment as to whether a free area having a size equal to or larger than the 1-minute recording/playback time length can be allocated. If such an area can be allocated, the formation of the judgment is followed by the steps of:

allocating the free area;

concatenating the remaining part of segment B denoted by notation "B–(2)" with a portion at the head of segment C1 denoted by notation "C1–(1)" in the figure to form a lump of data having a size equal to that of the allocated free area; and physically relocating the lump of data to the allocated free area to fill up the area.

If such a free area can not be allocated, on the other hand, the lump area is relocated to the area used to be occupied by segment B. In either case, segment B and segment C are fragmented.

After the lump of data has been relocated, it is necessary to form a judgment as to whether or not the length (a+b+c1–2) of the remaining part denoted by notation "C1–(2)" of segment C1 after removing the portion denoted by notation "C1-(1)" is at least an equivalent of the 1-minute recording/playback time length, or whether or not the remaining part denoted by notation "C1-(2)" of segment C1 is the last portion of the data. If either of the conditions is satisfied, a seek operation following an operation to play back a continuous segment having a size smaller than the 1-minute recording/playback time length can be eliminated in which case, the editing work is completed successfully. If both the conditions are not satisfied, on the other hand, the problem caused by the small length of the remaining part denoted by notation "C1-(2)" of segment C1 can be solved by applying an editing technique shown in FIG. 14 (4), a diagram showing an editing technique which comprises the steps of:

allocating a free area having a size of at least an equivalent of the 1-minute recording/playback time length;

concatenating the remaining part of segment C1 denoted by notation "C1-(2)" with a portion at the head of segment C2 denoted by notation "C2-(1)" in the figure to form a lump of data having a size equal to that of the allocated free area; and physically relocating the lump of data to the allocated free area to fill up the area.

After the lump of data has been relocated, it is necessary to form a judgment as to whether or not the length of the remaining part denoted by notation "C2-(2)" of segment C2 after removing the portion denoted by notation "C2-(1)" is at least an equivalent of the 1-minute recording/playback time length, or whether or not the remaining part denoted by notation "C2-(2)" of segment C1 is the last portion of the data. If either of the conditions is satisfied, a seek operation following an operation to play back a continuous segment having a size smaller than the 1-minute recording/playback time length can be eliminated in which case, the editing work is completed successfully. If both the conditions are not satisfied, on the other hand, the problem caused by the small length of the remaining part denoted by notation "C2-(2)" of segment C2 can be solved by applying an editing technique shown in FIG. 14 (5), a diagram showing an editing technique which comprises the steps of:

allocating a free area having a size of at least an equivalent of the 1-minute recording/playback time length;

concatenating the remaining part of segment C2 denoted by notation "C2-(2)" with a portion at the head of segment C3 denoted by notation "C3-(1)" in the figure to form a lump of data having a size equal to that of the allocated free area; and physically relocating the lump of data to the allocated free area to fill up the area.

Figure 15:
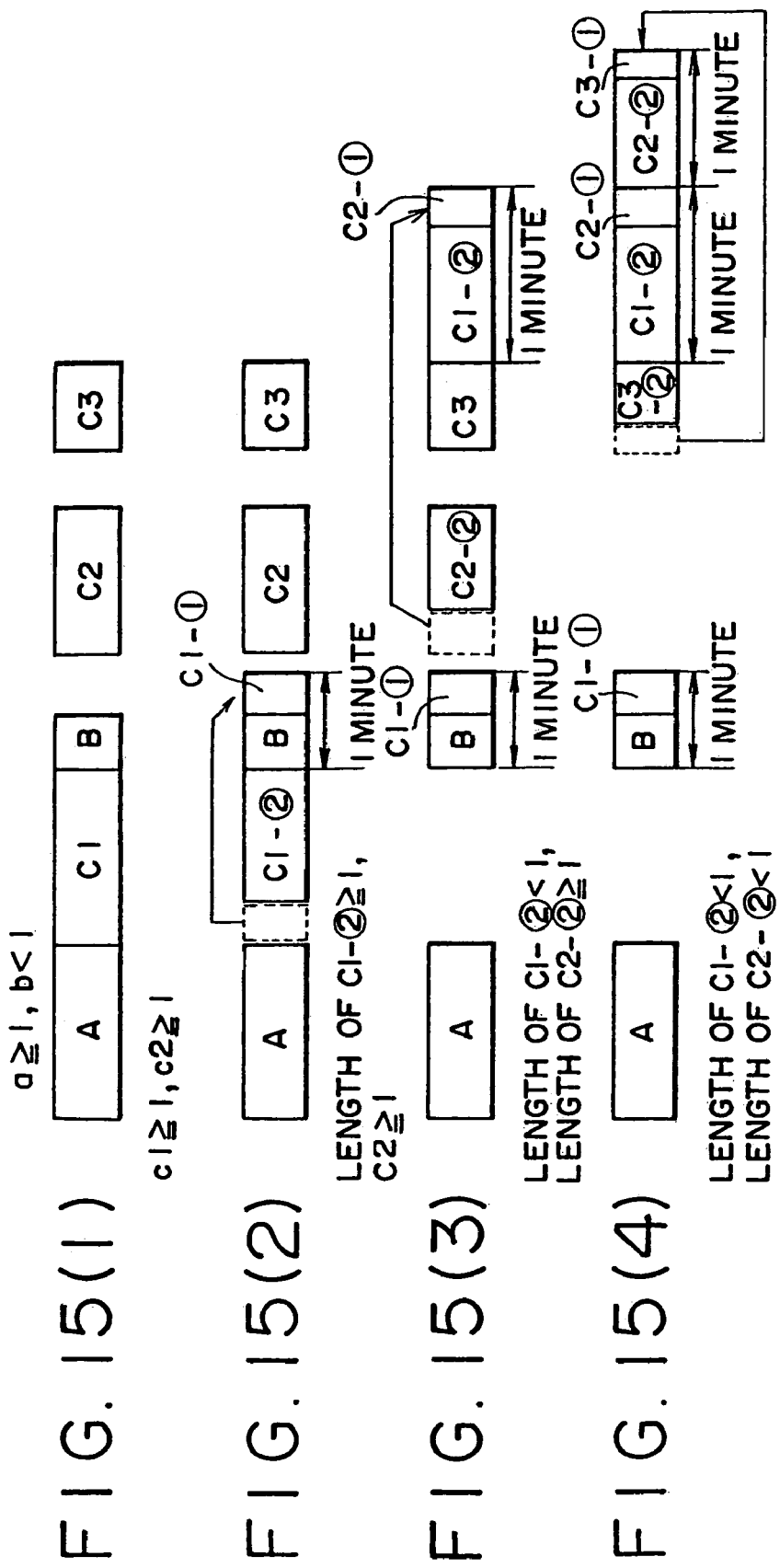
FIGS. 15 (1) to 15 (4) are diagrams showing still other examples of editing work carried out on a signal.

C Length a equal to or larger than the 1-minute recording/playback time length and length b smaller than the 1-minute recording/playback time length In order to solve this problem caused by the small length b of segment B, the data is edited by adopting a technique shown in FIG. 15 (2), a diagram showing an editing technique which comprises the steps of:

allocating a free area having a size of (1−b) right behind segment B; and relocating a portion at the head of segment C1 denoted by notation "C1-(1)" in the figure to fill up the free area.

As an alternative, the technique may comprise the steps of:

allocating a free area having a size of at least an equivalent of the 1-minute recording/playback time length;

concatenating the segment B with the portion at the head of segment C1 denoted by notation "C1-(1)" in the figure to form a lump of data having a size equal to that of the allocated free area; and physically relocating the lump of data to the allocated free area to fill up the area.

It should be noted that, if a free area having a size of at least an equivalent of the 1-minute recording/playback time length can not be allocated in either case, the editing can not be done and is thus ended unsuccessfully.

After the lump of data has been relocated, it is necessary to form a judgment as to whether or not the length of the remaining part denoted by notation "C1-(2)" of segment C1 after removing the portion denoted by notation "C1-(1)" is at least an equivalent of the 1-minute recording/playback time length, or whether or not the remaining part denoted by notation "C1-(2)" of segment C1 is the last portion of the data, that is, whether or not segment C1 is the last segment of the data. If either of the conditions is satisfied, a seek operation following an operation to play back a continuous segment having a size smaller than the 1-minute recording/playback time length can be eliminated in which case, the editing work is completed successfully. If both the conditions are not satisfied, on the other hand, the problem caused by the small length of the remaining part denoted by notation "C1-(2)" of segment C1 can be solved by applying editing techniques shown in FIGS. 15 (3) and 15 (4) which are similar to those shown in FIGS. 13 (4) and 13 (5) described earlier respectively.

D Both lengths a and b smaller than the 1-minute recording/playback time length

In this case, editing work for a total length (a+b) equal to or larger than the 1-minute recording/playback time length is different from that for a total length (a+b) smaller than the 1-minute recording/playback time length. The following description begins with a case shown in FIG. 16 (1) in which the total length (a+b) is smaller than the 1-minute recording/playback time length. The case requires a technique shown in FIG. 16 (2), a diagram showing an editing technique which comprises:

allocating a free area having a size of at least an equivalent of the 1-minute recording/playback time length;

concatenating segments A and B with a portion at the head of segment C1 denoted by notation "C1-(1)" in the figure to form a lump of data having a size equal to that of the allocated free area; and physically relocating the lump of data to the allocated free area to fill up the area.

As an alternative, the editing technique may comprise the steps of:

allocating a free area having a size of (1−b) right behind segment B; and physically relocating a portion at the head of segment C1 denoted by notation "C1-(1)" in the figure to fill up the free area.

It should be noted that, if a free area having a size of at least an equivalent of the 1-minute recording/playback time length can not be allocated in either case, the editing can not be done and is thus ended unsuccessfully.

After the lump of data has been relocated, it is necessary to form a judgment as to whether or not the length of the remaining part denoted by notation "C1-(2)" of segment C1 after removing the portion denoted by notation "C1-(1)" is at least an equivalent of the 1-minute recording/playback time length, or whether or not the remaining part denoted by notation "C1-(2)" of segment C1 is the last portion of the data, that is, whether or not segment C1 is the last segment of the data. If either of the conditions is satisfied, a seek operation following an operation to play back a continuous segment having a size smaller than the 1-minute recording/playback time length can be eliminated in which case, the editing work is completed successfully. If both the conditions are not satisfied, on the other hand, the problem caused by the short length of the remaining part denoted by notation "C1–(2)" of segment C1 can be solved by applying an editing techniques shown in FIGS. 16 (3) and 16 (4) which are similar to those shown in FIGS. 13 (4) and 13 (5) described earlier respectively.

Figure 17:
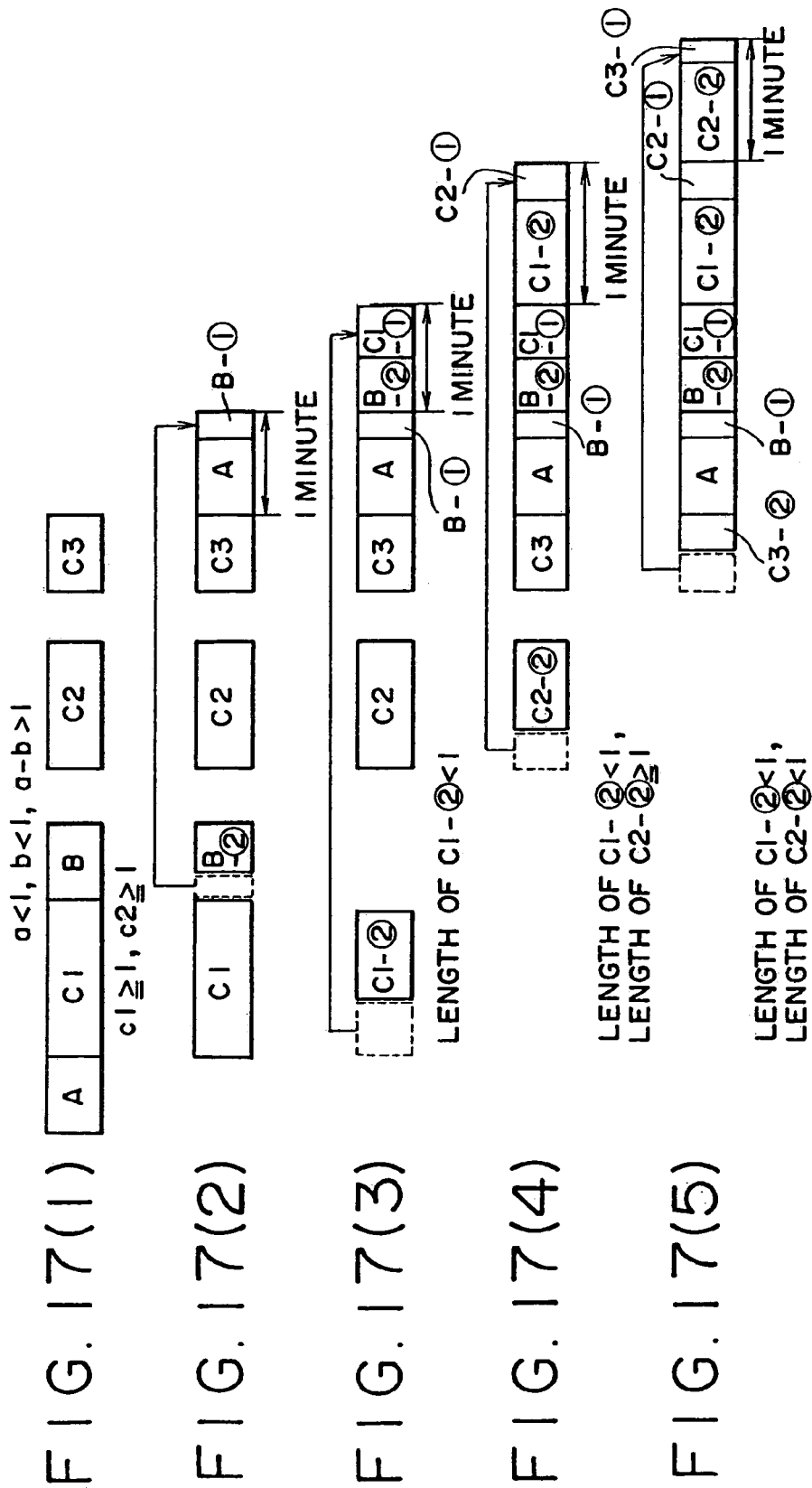
FIGS. 17 (1) to 17 (5) are diagrams showing still further examples of editing work carried out on a signal.

The following is description of a case shown in FIG. 17 (1) in which the total length (a+b) is at least an equivalent of the 1-minute recording/playback time length. In this case, it is necessary to apply a technique shown in FIG. 17 (2), a diagram showing an editing technique which comprises:

allocating a free area having a size of at least an equivalent of the 1-minute recording/playback time length;

concatenating segment A with a portion at the head of segment B denoted by notation "B–(1)" in the figure to form a lump of data having a size equal to that of the allocated free area; and physically relocating the lump of data to the allocated free area to fill up the area.

It should be noted that, if a free area having a size of at least an equivalent of the 1-minute recording/playback time length can not be allocated in either case, the editing can not be done and is thus ended unsuccessfully.

After the lump of data has been relocated, it is necessary to form a judgment as to whether or not the length of the remaining part denoted by notation "C1–(2)" of segment C1 after removing the portion denoted by notation "C1–(1)" is at least an equivalent of the 1-minute recording/playback time length, or whether or not the remaining part denoted by notation "C1–(2)" of segment C1 is the last portion of the data, that is, whether or not segment C1 is the last segment of the data. If either of the conditions is satisfied, a seek operation following an operation to play back a continuous segment having a size smaller than the 1-minute recording/playback time length can be eliminated in which case, the editing work is completed successfully. If both the conditions are not satisfied, on the other hand, the problem caused by the short length of the remaining part denoted by notation "C1–(2)" of segment C1 can be solved by applying an editing techniques shown in FIGS. 17 (4) and 17 (5) which are similar to those shown in FIGS. 13 (4) and 13 (5) described earlier respectively.

In the cases discussed in subsections A to D, segment B to be inserted is recorded in one continuous area. The following subsections describe cases in which segment B comprises sub-segments B1, B2 and B3 which are recorded in areas physically separated from each other. It is assumed that, as a single segment, there is an assurance that data of segment B can be reproduced without generating a playback time break caused by a seek operation which is in turn attributed to a track jump. That is to say, sub-segments B1 and B2 each have a length equal to or larger than the 1-minute recording/playback time length. To be played back last, on the other hand, sub-segment B3 can be at least or smaller than the 1-minute recording/playback time length in size.

E Both lengths a and b (=b1+b2+b3) equal to or larger than the 1-minute recording/playback time length Processing for a case in which sub-segment B3 has a length b3 equal to or larger than the 1-minute recording/playback time length is different from a case with the length b3 smaller than the 1-minute recording/playback time length. In the former case shown in FIG. 18 (1), it is necessary to form a judgment as to whether or not the length c1 of segment C1 is at least an equivalent of the 1-minute recording/playback time length or whether or not segment C1 is the last segment of the data. If either of the conditions is satisfied, a seek operation following an operation to play back a continuous segment having a size smaller than the 1-minute recording/playback time length can be eliminated in which case, the editing work is completed successfully by merely correcting the playback pointers. If both the conditions are not satisfied, on the other hand, the problem caused by the short length of segment C1 can be solved by applying an editing techniques shown in FIGS. 18 (2) and 18 (3) which are similar to those shown in FIGS. 13 (4) and 13 (5) described earlier respectively.

Figure 19:
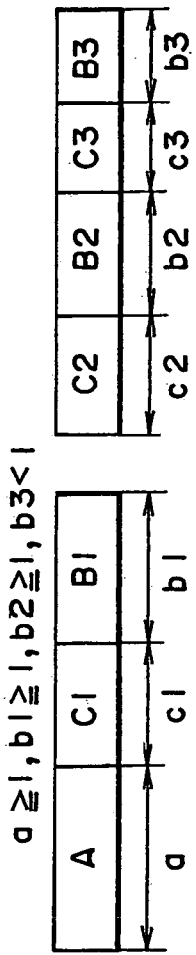
FIGS. 19 (1) to 19 (4) are diagrams showing still further examples of editing work carried out on a signal.
Figure 19:
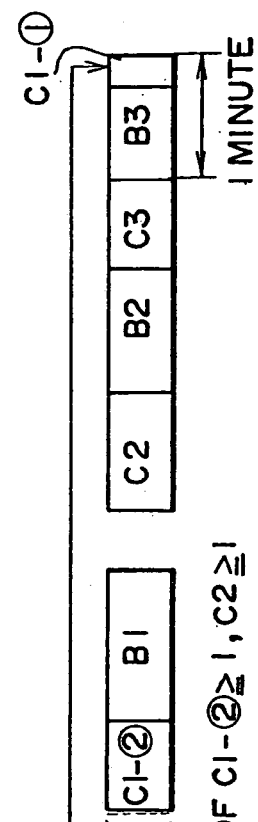
Figure 19:
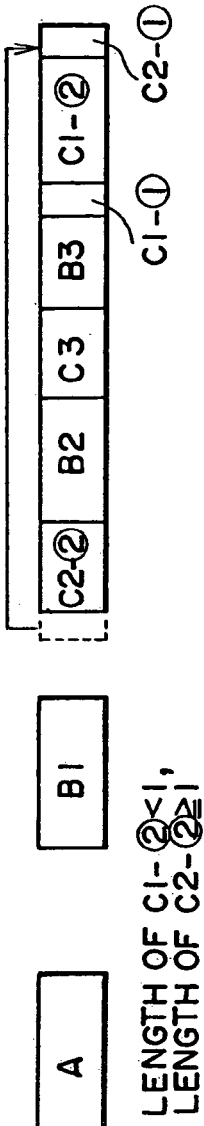
Figure 19:
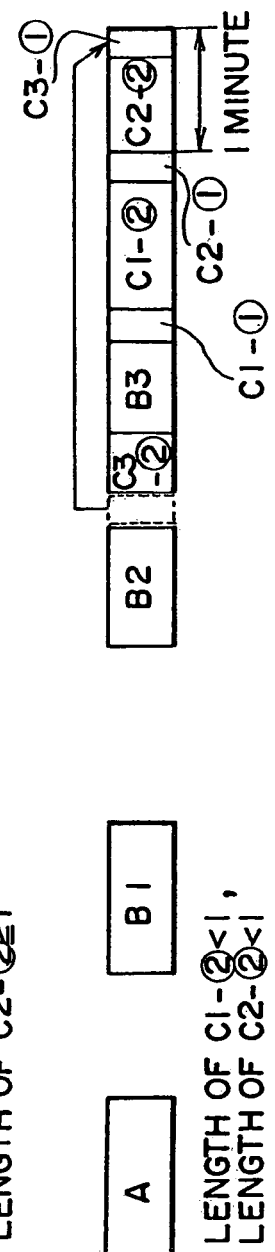

FIG. 19 (1) is a diagram showing a case in which the length b3 of sub-segment B3 is smaller than the 1-minute recording/playback time length. In this case, it is necessary to apply a technique shown in FIG. 19 (2), a diagram showing an editing technique which comprises:

allocating a free area having a size of at least an equivalent of the 1-minute recording/playback time length;

concatenating sub-segment B3 with a portion at the head of segment C1 denoted by notation "C1–(1)" in the figure to form a lump of data having a size equal to that of the allocated free area; and physically relocating the lump of data to the allocated free area to fill up the area.

After the lump of data has been relocated, it is necessary to form a judgment as to whether or not the length of the remaining part denoted by notation "C1–(2)"of segment C1 after removing the portion denoted by notation "C1–(1)" is at least an equivalent of the 1-minute recording/playback time length, or whether or not the remaining part denoted by notation "C1–(2)" of segment C1 is the last portion of the data, that is, whether or not segment C1 is the last segment of the data. If either of the conditions is satisfied, a seek operation following an operation to play back a continuous segment having a size smaller than the 1-minute recording/playback time length can be eliminated in which case, the editing work is completed successfully. If both the conditions are not satisfied, on the other hand, the problem caused by the short length of the remaining part denoted by notation. "C1–(2)" of segment C1 can be solved by applying an editing techniques shown in FIGS. 19 (3) and 19 (4) which are similar to those shown in FIGS. 13 (4) and 13 (5) described earlier respectively.

Figure 20:
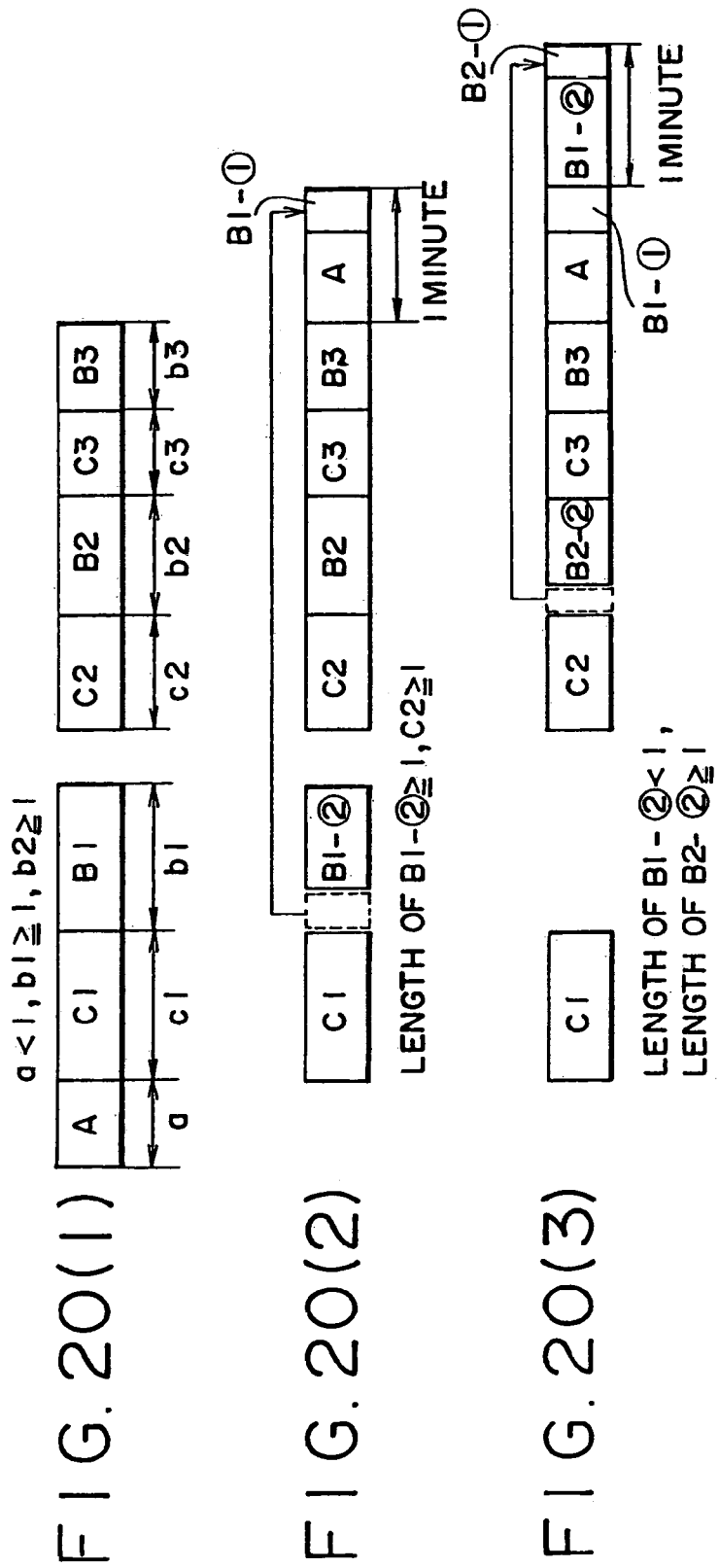
FIGS. 20 (1) to 20 (3) are diagrams showing still further examples of editing work carried out on a signal.

F Length a of smaller than the 1-minute recording/playback time length and length b (=b1+b2+b3) equal to or larger than the 1-minute recording/playback time length FIG. 20 (1) is a diagram showing a case in which the length a is smaller than the 1-minute recording/playback time length and the length b (=b1+b2+b3) is at least an equivalent of the 1-minute recording/playback time length. In this case, it is necessary to apply a technique shown in FIG. 20 (2), a diagram showing an editing technique which comprises:

allocating a free area having a size of at least an equivalent of the 1-minute recording/playback time length;

concatenating segment A with a portion at the head of sub-segment B1 denoted by notation "B1–(1)" in the figure to form a lump of data having a size equal to that of the allocated free area; and physically relocating the lump of data to the allocated free area to fill up the area.

After the lump of data has been relocated, it is necessary to form a judgment as to whether or not the length of the remaining part denoted by notation "B1–(2)" of sub-segment B1 after removing the portion denoted by notation "B1–(1)" is at least an equivalent of the 1-minute recording/playback time length. If the remaining part denoted by notation "B1–(2)" of sub-segment B1 is at least an equivalent of the 1-minute recording/playback time length in length, a seek operation following an operation to play back a continuous segment having a size smaller than the 1-minute recording/playback time length can be eliminated in which case, the editing work is completed successfully. If the remaining part denoted by notation "B1–(2)" of sub-segment B1 is smaller than the 1-minute recording/playback time length in length, on the other hand, it is necessary to apply a technique shown in FIG. 20 (3), a diagram showing an editing technique which comprises:

allocating a free area having a size equal to or larger than the 1-minute recording/playback time length;

concatenating the remaining part denoted by notation "B1–(2)" of sub-segment B1 with a portion at the head of sub-segment B2 denoted by notation "B2–(1)" in the figure to form a lump of data having a size equal to that of the allocated free area; and physically relocating the lump of data to the allocated free area to fill up the area.

After the lump of data has been relocated, it is necessary to form a judgment as to whether or not the length of the remaining part denoted by notation "B2–(2)" of sub-segment B2 after removing the portion denoted by notation "B2–(1)" is at least an equivalent of the 1-minute recording/playback time length. If the remaining part denoted by notation "B2–(2)" of sub-segment B2 is at least an equivalent of the 1-minute recording/playback time length in length, a seek operation following an operation to play back a continuous segment having a size smaller than the 1-minute recording/playback time length can be eliminated in which case, the editing work is completed successfully. If the remaining part denoted by notation "B2–(2)" of sub-segment B1 is smaller than the 1-minute recording/playback time length in length, on the other hand, it is necessary to repeat the processing described above for the remaining part denoted by notation "B2–(2)" of sub-segment B2 and sub-segment B3.

In the editing techniques described above, the minimum size of a continuous segment is set at a value equivalent to the 1-minute recording/playback time length. It should be noted that this value can be changed depending on the seek time, the rotation wait time and the settle time of the signal playback apparatus. For example, the minimum size of a continuous segment is set at a multiple or a fraction of the equivalent of the 1-minute recording/playback time length. In addition, the minimum size of a continuous segment can be set in dependence on factors other than the time related parameters. To be more specific, the minimum size of a continuous segment can be set at an equivalence of a predetermined amount of data, the GOP unit used in the MPEG encoding process or a data unit used in internal processing such a packet or a block.

As described in detail above, according to the present invention, the amount of data stored in advance in the read buffer memory during the time is large enough to eliminate a next playback time break, that is, to be output during a next track jump in a seek operation entailing not only a seek time, but also a rotation wait time and a settle time. As a result, the eventual playback signal can be generated continuously. In addition, the time it takes to optimize data recorded in the disc by defragmentazion of the data can be reduced substantially.

What is claimed is:

1. A data recording method for recording data onto a recording medium to be reproduced by a reproduction device, comprising the steps of:

inserting into data to be recorded variable bit-rate data having a size smaller than a predetermined length;

wherein the variable bit-rate data is encoded in MPEG format, and said predetermined length being determined on the basis of the length of time for which the variable bit-rate data can be reproduced at a maximum bit-rate without an interruption;

combining the inserted variable bit-rate data with recorded data adjacent to the inserted variable bit-rate data to form a data unit of at least said predetermined length;

recording the data unit in a continuous recordable area on the recording medium, in which the recording step includes detecting the length of a remaining portion of the next part of the data to be recorded, that was not recorded, and if said remaining portion has a length less than said predetermined length, then locating another non-recorded area on said recording medium having a size of at least said predetermined length.

* * * * *